Patented Dec. 27, 1932

1,892,409

UNITED STATES PATENT OFFICE

SPENCER W. PRENTISS, OF WELLESLEY, MASSACHUSETTS, ASSIGNOR TO POTLATCH FORESTS, INC., OF LEWISTON, IDAHO, A CORPORATION OF MAINE

PROCESS OF DIGESTING WOOD

No Drawing.  Application filed December 16, 1931. Serial No. 581,521.

This invention relates to a new process of digesting finely divided wood and the product of such process. The process consists of a digestion treatment whereby the finely divided wood is converted into a material suitable for molding into any one of various forms including flat board-like forms of rectangular cross section. This resultant molded material is compact, exceedingly water resistant, very hard and strong and of relatively high specific gravity. The product resembles lignum vitae in many respects.

For the treatment of finely divided wood in accordance with a preferred embodiment of the present invention, I digest the wood with phenol or its homologues in the presence of aqueous ammonia (or its equivalent) the digestion being carried out under pressure and for a considerable period of time as hereinafter described. Though the chemical phenomena which occur upon cooking or digesting the wood chips, or other finely divided wood, with phenol is not fully understood, it is believed that the effect is not unlike that produced by the sulphite process of wood digestion. Following the digestion of the wood, as thus described, there is added to the resulting mixture, an aldehydic body, for example such as formaldehyde or furfural, preferably in the form of an aqueous solution and then after the mixture is heated, the solid material after having been drained, washed and dried, is ready for molding.

The specific formula and treatment in accordance with a preferred example is as follows:—

|  | Parts by weight |
|---|---|
| Finely divided wood (air-dry) | 100 |
| Phenol | 29 |
| Aqua-ammonia (S.G. 0.90) | 12 |
| Water | 800 |

The digestion of this mixture is carried out under a pressure of between two hundred and three hundred pounds per square inch and is continued for a period of approximately four hours. Following the digestion, 29 parts (by weight) of formaldehyde is added in the form of an aqueous solution formed of 29 parts formaldehyde and 43 parts water, and the mixture is then boiled for one hour under atmospheric pressure using suitable means for condensing the vapors and returning the condensate to the mixture.

The solid material is now drained to remove any free liquid, and preferably dried (though the drying step is not essential) and may then be molded into the desired shape by subjecting it to a pressure of one thousand pounds per square inch at a temperature of 150° C. The length of time for which this pressure and temperature need be maintained is, of course, determined by the cross section of the molded product. If, for example, the final product is ¾" by 4" in its cross sectional dimension, a suitable time has been found to be approximately an hour, but this may be varied within certain limits.

Though the phrase aldehydic body does not strictly and technically include hexamethylene tetramine or similar bodies, for the purposes of this application they are regarded as aldehydic bodies in as much as their resultant action is essentially the same.

Having described my invention, what I wish to claim and secure by Letters Patent is:—

1. The process of treating finely divided wood which comprises digesting said wood under heat and pressure in an aqueous alkaline phenol solution, adding an aldehydic body to the digested product, then heating the same, removing the surplus liquid and then molding the resultant solid material by subjecting said material to heat and pressure.

2. The process of treating finely divided wood which comprises digesting said wood under heat and pressure in an aqueous phenol solution containing ammonia, adding an aldehydic body to the digested product, then heating the same, and then draining and molding the resultant solid material by subjecting said material to heat and pressure.

3. The process of treating finely divided wood which comprises digesting said wood for a period of at least two hours under heat and pressure in an aqueous alkaline phenol solution, then adding an aldehydic body to the digested product, then heating the same, and then draining and molding the resultant solid material by subjecting said material to heat and pressure.

4. The process of treating finely divided wood which comprises digesting said wood for a period of hours under heat and pressure in an aqueous phenol solution, then adding an aldehydic body to the digested product, then heating the same, and then draining and molding the solid material by subjecting said material to a heat of at least 100° C. and a pressure of at least several hundred pounds per square inch.

5. The process of treating finely divided wood which comprises digesting said wood under heat and pressure in an aqueous alkaline solution including phenol, and at some stage of the process adding an aldehydic body to said wood and thereafter heating the mixture, and then draining and molding the resultant solid material by subjecting said material to heat and pressure.

6. The process of treating finely divided wood which comprises digesting said wood for a period of hours under heat and pressure in an aqueous alkaline solution including phenol and an aldehydic body, thereafter heating the mixture, and then draining and molding the resultant solid material by simultaneously subjecting said material to a heat of at least 100° C., and a pressure of at least several hundred pounds per square inch.

SPENCER W. PRENTISS.